US010670032B2

(12) United States Patent
Aihara et al.

(10) Patent No.: US 10,670,032 B2
(45) Date of Patent: *Jun. 2, 2020

(54) SEALING STRUCTURE FOR CASING

(71) Applicant: NOK Corporation, Tokyo (JP)

(72) Inventors: Kazuya Aihara, Fukushima (JP); Shinya Nakaoka, Shizuoka (JP); Isao Tanji, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,118

(22) Filed: Nov. 7, 2018

(65) Prior Publication Data
US 2019/0072101 A1 Mar. 7, 2019

Related U.S. Application Data

(62) Division of application No. 15/535,941, filed as application No. PCT/JP2015/079159 on Oct. 15, 2015, now Pat. No. 10,371,160.

(30) Foreign Application Priority Data

Dec. 19, 2014 (JP) .................. 2014-257408
Dec. 26, 2014 (JP) .................. 2014-266479

(51) Int. Cl.
F16J 15/08 (2006.01)
F04D 29/08 (2006.01)
F04B 39/00 (2006.01)
F16J 15/10 (2006.01)
F04D 29/42 (2006.01)

(52) U.S. Cl.
CPC ............ F04D 29/086 (2013.01); F04B 39/00 (2013.01); F04D 29/426 (2013.01);
(Continued)

(58) Field of Classification Search
CPC ... F04D 29/086; F04D 29/426; F16J 15/0818; F16J 15/10; F16J 2015/0837;
(Continued)

(56) References Cited

U.S. PATENT DOCUMENTS 5,022,664 A 6/1991 Kitada et al.
7,703,775 B2 4/2010 Matsushita et al.
(Continued)

FOREIGN PATENT DOCUMENTS

CN 201170140 Y 12/2008
CN 203271902 U 11/2013
(Continued)

OTHER PUBLICATIONS

International Search Report for Patent Application No. PCT/JP2015/079159 dated Jan. 12, 2016 (3 pages).
(Continued)

Primary Examiner — Gilbert Y Lee
(74) Attorney, Agent, or Firm — Harness, Dickey & Pierce, P.L.C.

(57) ABSTRACT

It is an object of the present invention to provide a sealing structure for a casing that can reduce the number of used gaskets and achieve further weight reduction, with the sealing function of the gaskets secured. The object is solved by including: a case 2 having an opened top; a cover 3 attached to the top of the case 2 to form a fluid flow path therein; a center plate 5 interposed between the case 2 and the cover 3 and partitions an inner space into the side of the case 2 and the side of the cover 3; and a gasket 4, which is disposed between the case 2 and the cover 3, and forming the center plate 5 so as to have a size that is within an inner peripheral side relative to a sealing line 41 of the gasket 4 and stacking this center plate on the gasket 4, and attaching the cover 3 to the top of the case 2 with the stacked gasket
(Continued)

4 and center plate 5 sandwiched there between to compress the gasket 4 with the mutual butting surfaces between the case 2 and the cover 3.

14 Claims, 9 Drawing Sheets

(52) U.S. Cl.
CPC ......... *F16J 15/0818* (2013.01); *F16J 15/104* (2013.01); *F16J 15/10* (2013.01); *F16J 2015/0837* (2013.01); *F16J 2015/0856* (2013.01)

(58) Field of Classification Search
CPC ......... F16J 2015/0843; F16J 2015/0868; F16J 2015/0856
See application file for complete search history.

(56) References Cited

U.S. PATENT DOCUMENTS

| | | | |
|---|---|---|---|
| 8,939,452 | B2 | 1/2015 | Matsushita et al. |
| 2007/0090609 | A1 | 4/2007 | Kasuya |
| 2014/0333034 | A1 | 11/2014 | Janthur |

FOREIGN PATENT DOCUMENTS

| | | |
|---|---|---|
| CN | 103946531 A | 7/2014 |
| EP | 0 338 809 A2 | 10/1989 |
| JP | 7158589 | 6/1995 |
| JP | 11125118 | 5/1999 |
| JP | 2001-107884 A | 4/2001 |
| JP | 2005-030248 A | 2/2005 |
| JP | 2006-105085 A | 4/2006 |

OTHER PUBLICATIONS

International Preliminary Report on Patentability and Written Opinion for Patent Application No. PCT/JP2015/079159 dated Jan. 12, 2016 (7 pages).
Extended European Search Report for Patent Application No. EP15869641.9 dated Jul. 24, 2018 (7 pages).
Chinese Office Action for Patent Application No. CN 2015080069204.3 dated Dec. 1, 2017 (11 pages).
European Office Action for Patent Application No. EP 15869641.9 dated Jul. 22, 2019 (5 pages).
European Office Action for Patent Application No. 15869641.9 dated Mar. 31, 2020 (4 pages).

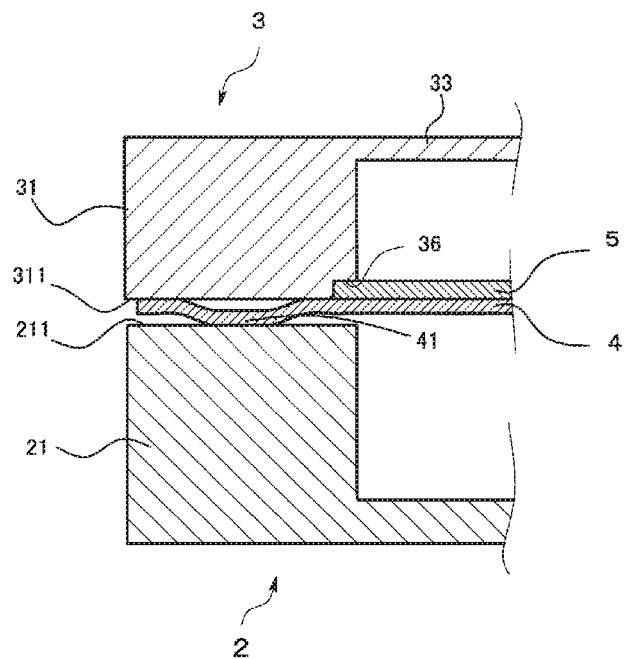
Fig. 4
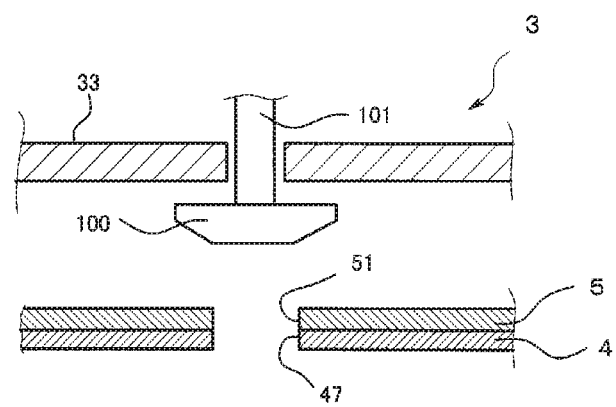
Fig. 5
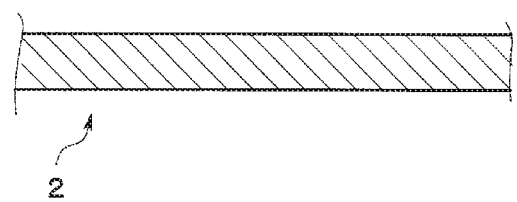

SEALING STRUCTURE FOR CASING

This application is a divisional of U.S. application Ser. No. 15/535,941 filed Jun. 14, 2017 which is a U.S. National Stage Application claiming priority to PCT/JP2015/079159 filed Oct. 10, 2015 which claims priority to Japanese Application JP2014257408 filed Dec. 19, 2014 and to Japanese Application JP2014266479 filed Dec. 26, 2014.

FIELD OF THE INVENTIONS

The present invention relates to a sealing structure for a casing, and more particularly, to a sealing structure for a casing to be sealed with a gasket, the casing having an inner structure partitioned with a center plate.

BACKGROUND OF THE INVENTIONS

Generally, water pumps circulate coolants in water-cooled engines of automobiles or other machines. Such a water pump has a casing (which is also referred to a body). The casing is formed by butting a case against a cover, and an impeller is disposed in the inner space of the casing. The water pump rotates the impeller so as to draw a coolant from a radiator into the casing and cause the coolant to flow out to an engine outside the casing (Patent Document 1).

Conventionally, an example of the casing of such a water pump has a center plate (which is also referred to a partition board) so as to partition a flow path for a coolant into an upstream side (an inflow side, a radiator side) and a downstream side (an outflow side, an engine side) (Patent Document 2).

In the casing structure having such a center plate, an opening may occur in the butting surfaces between the case and the cover when an internal pressure is applied by the rotation of the impeller. For this reason, gaskets are disposed on both sides of the center plate and the two gaskets and the one center plate are sandwiched between the case and the cover so as to form sealing areas between the center plate and the case as well as between the center plate and the cover to seal a space between the case and the cover.

PRIOR ART DOCUMENTS

Patent Documents

Patent Document 1: JP-A-H07-158589
Patent Document 2: JP-A-H11-125118

SUMMARY OF THE INVENTION

Problem to be Solved by the Invention

In recent years, there has been required to reduce the weight of automobile bodies to improve fuel consumption for vehicles. For such a requirement, efforts for weight reduction in various apparatuses constituting vehicles have been made. Now, there is a need for weight reduction at component level as well, and also, there is a need for weight reduction in the entirety including components (gaskets) for a water pump.

A conventional casing in which sealing areas are formed on both sides of a center plate needs two gaskets and has a problem in weight reduction.

It is an object of the present invention to provide a sealing structure for a casing that can reduce the number of used gaskets and achieve further weight reduction with the sealing function of the gaskets secured.

Another object of the present invention will be apparent from the following description.

Means for Solving Problem

The above-mentioned problems are solved by the following respective inventions.
1. A sealing structure for a casing, comprising:
   a case having an opened top;
   a cover that is attached to the top of the case to form a flow path for a fluid therein;
   a center plate between the case and the cover, the center plate partitioning an inner space into a side of the case and a side of the cover; and
   a gasket between the case and the cover, wherein
   the center plate is formed so as to have a size that is within an inner peripheral side relative to a sealing line of the gasket and is stacked on the gasket, and
   the cover is attached to the top of the case by sandwiching the stacked gasket and center plate therebetween so as to compress the gasket with mutual butting surfaces between the case and the cover.
2. The sealing structure for the casing according to 1, wherein the center plate is fixed to the gasket with a fixing portion at a part that deviates from the sealing line of the gasket.
3. The sealing structure for the casing according to 2, wherein the fixing portion comprises a claw portion on at least one of the gasket or the center plate, and the claw portion is bent so as to hold the center plate or the gasket to fix the center plate to the gasket.
4. The sealing structure for the casing according to 2, wherein the fixing portion comprises a rivet and the center plate is riveted on the gasket.
5. The sealing structure for the casing according to any one of 1 to 4, wherein a supporter is formed on an inner peripheral side of the sealing line of the gasket to support the stacked center plate.
6. The sealing structure for the casing according to 5, wherein the supporter is a plane portion to support the center plate with a surface.
7. The sealing structure for the casing according to 5, wherein the supporter is a beam portion to support the center plate on a beam structure.
8. The sealing structure for the casing according to any one of 1 to 7, wherein the case or the cover has an engaging portion that engages and receives the center plate.

Effect of the Invention

According to the present invention, a sealing structure for a casing that can reduce the number of used gaskets and achieve further weight reduction with the sealing function of the gaskets secured can be provided.

BRIEF DESCRIPTION OF THE DRAWINGS

FIG. 4 is an end view of the casing taken along the line (iv)-(iv) in FIG. 1;

FIG. 5 is an end view of the casing taken along the line (v)-(v) in FIG. 1;

DETAILED DESCRIPTION OF THE INVENTIONS

First Invention

Figure 1:
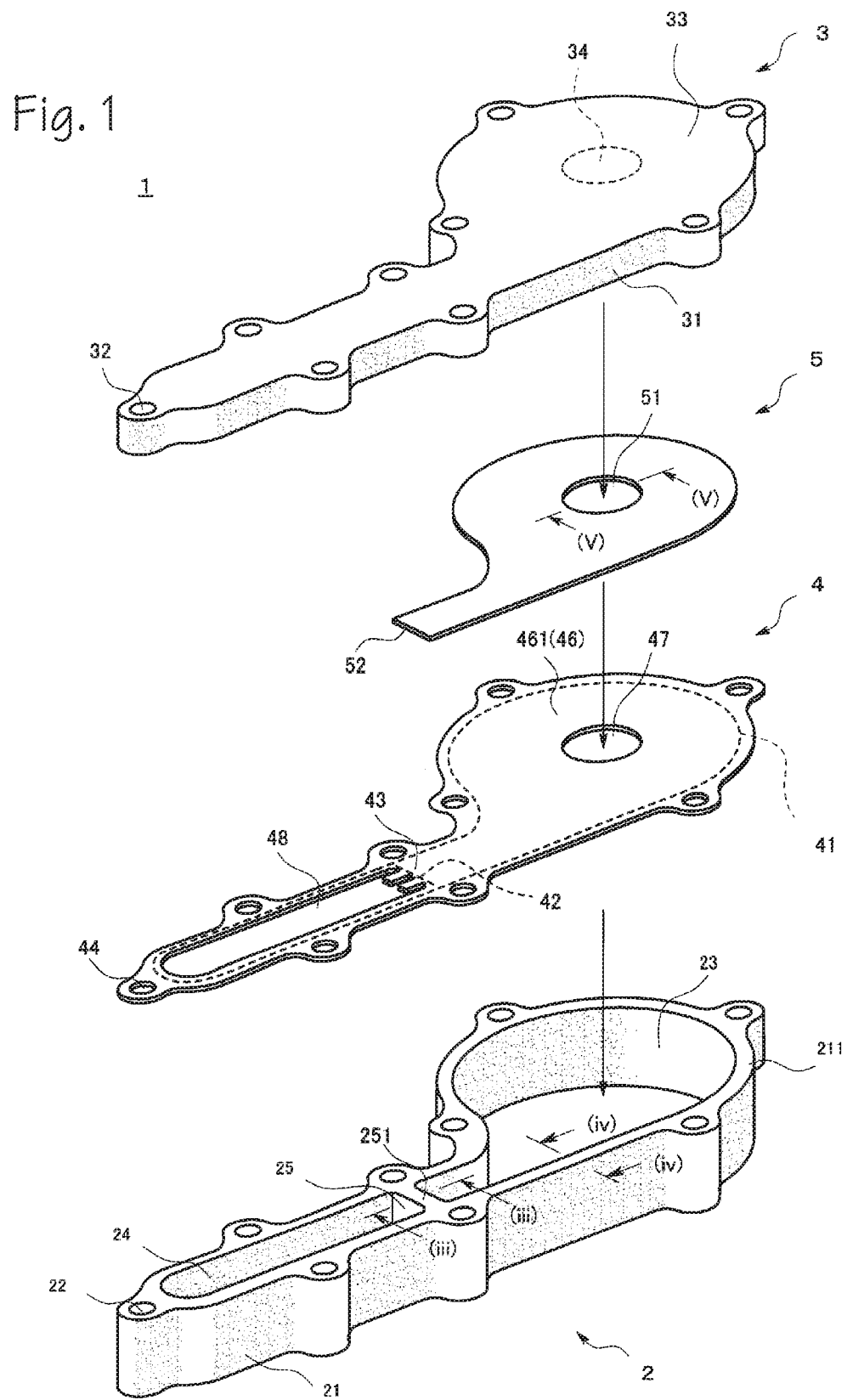
FIG. 1 is an exploded perspective view of an embodiment of a sealing structure for a casing according to the present invention.

Embodiments of the present invention will be described below with reference to the drawings.

An embodiment of the first invention described below illustrates a sealing structure for a casing for a water pump. The configuration of such a water pump is publicly known. Thus, in the drawings, only parts related to the sealing structure of a casing are shown and components of the water pump are not shown except a part, in order to clarify the present invention.

Figure 2:
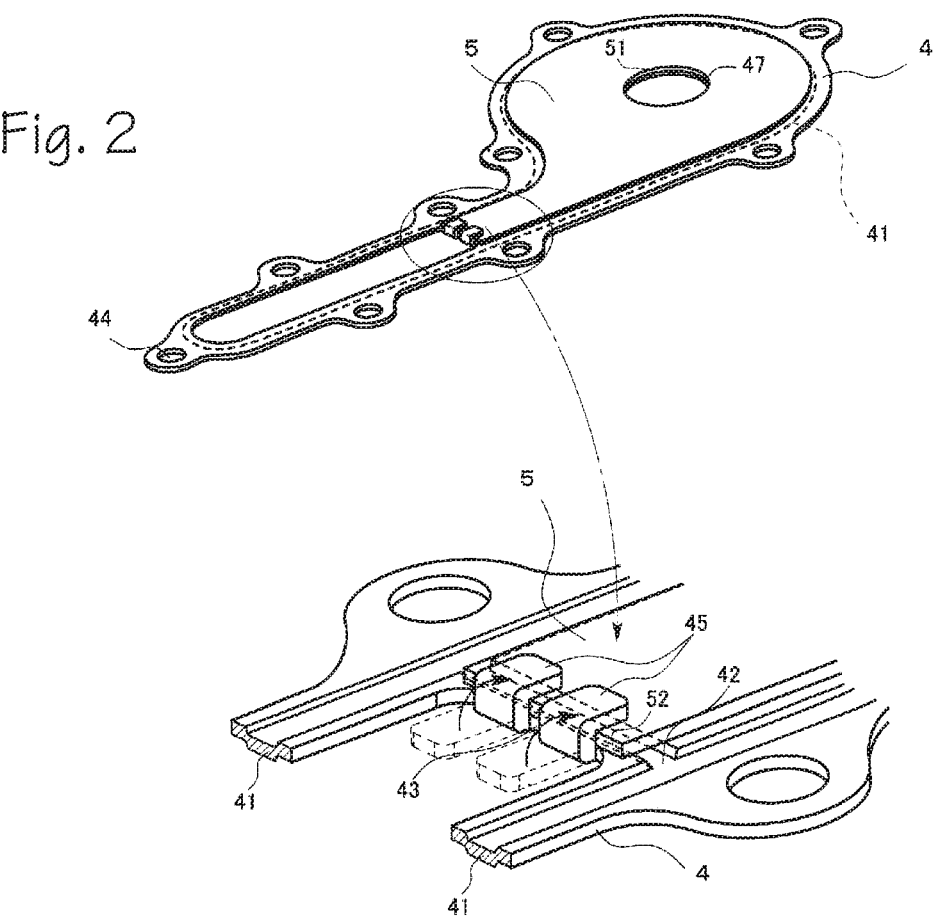
FIG. 2 is a perspective view of a gasket and a center plate of the sealing structure shown in FIG. 1.
Figure 3:
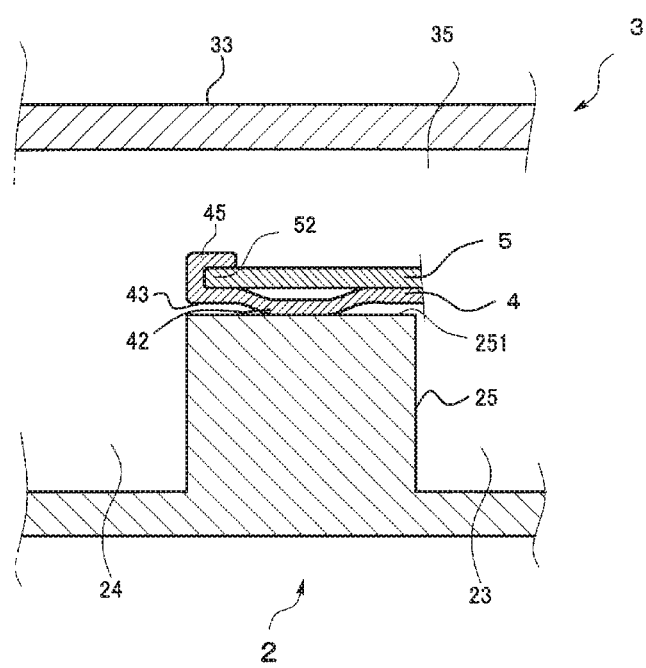
FIG. 3 is an end view of the casing taken along the line (iii)-(iii) in FIG. 1.
Figure 6:
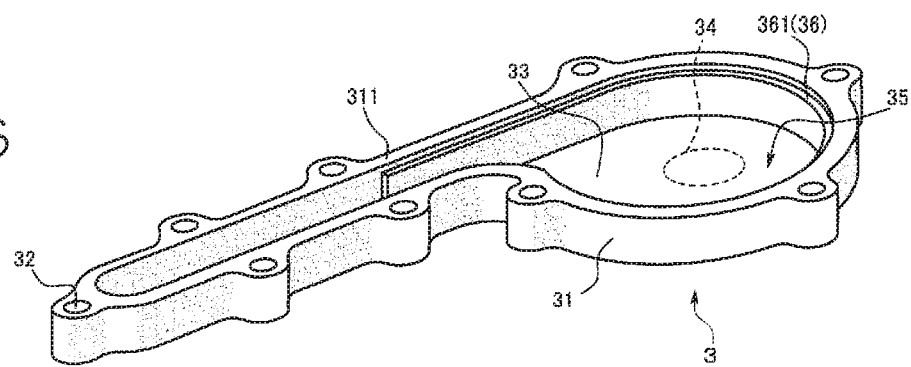
FIG. 6 is a perspective view of a cover of the casing shown in FIG. 1 in the vertically inverted state.

FIG. 1 is an exploded perspective view of an embodiment of a sealing structure for a casing according to the present invention. FIG. 2 is a perspective view of a gasket and a center plate of the sealing structure shown in FIG. 1. FIG. 3 is an end view of the casing taken along the line (iii)-(iii) in FIG. 1. FIG. 4 is an end view of the casing taken along the line (iv)-(iv) in FIG. 1. FIG. 5 is an end view of the casing taken along the line (v)-(v) in FIG. 1. FIG. 6 is a perspective view of a cover of the casing shown in FIG. 1 in the vertically inverted state.

The casing 1 includes a case 2 and a cover 3, and a gasket 4 and a center plate 5 are disposed between the case 2 and the cover 3. The cover 3 is attached to the case 2 from the top side in the drawings so as to sandwich the gasket 4 and the center plate 5 therebetween to form therein a flow path for a coolant. Each of the case 2 and the cover 3 is shown as a separate component, but may be a part of an engine or an engine-related component, for example.

The case 2 has an appropriate number of bolt holes 22 on the outside of a side peripheral wall 21 and includes an upstream chamber 23 and a downstream chamber 24 therein, the upstream chamber 23 communicating with a radiator, the downstream chamber 24 communicating with an engine. The upstream chamber 23 includes an inlet (not shown). The inlet causes a coolant to flow in from the radiator. The downstream chamber 24 includes an outlet (not shown). The outlet causes the coolant to flow out to the engine by the rotation of an impeller 100 (see FIG. 5), which is disposed in the interior of the cover 3.

The interior of the case 2 is partitioned into two areas by a partition wall 25, which extends across the opposing sides on the side peripheral wall 21, to form the upstream chamber 23 and the downstream chamber 24. The upper end surface 251 of the partition wall 25 is formed so as to have the same height as the upper end surface 211 of the side peripheral wall 21. The upstream chamber 23 and the downstream chamber 24 are opened toward the top of the case 2 on which the cover 3 is provided.

The cover 3 includes a side peripheral wall 31, which has the same shape as that of the side peripheral wall 21 of the case 2, and has bolt holes 32 on the outside of the side peripheral wall 31. The positions of the bolt holes 32 and their number correspond to those of the bolt holes 22 of the case 2. An upper end surface 311 of the side peripheral wall 31 of the cover 3 and an upper end surface 211 of the side peripheral wall 21 of the case 2 form the butting surfaces on the case 2 and the cover 3, respectively. A bottom wall 33 of the cover 3 corresponding to the upstream chamber 23 of the case 2 has a penetrating portion 34 through which a shaft portion 101 (see FIG. 5) of the impeller 100 penetrates.

The cover 3 is attached to the top of the case 2 to form therein a fluid flow path 35. The fluid flow path communicates the upstream chamber 23 with the downstream chamber 24 over the partition wall 25 of the case 2.

The gasket 4 is formed of a thin metal substrate, such as a stainless steel sheet, a cold-rolling steel sheet, a galvanized steel sheet, and an aluminum composite sheet.

It is preferable that the surfaces of the metal substrate be coated with an elastic body for better sealing properties. Such an elastic body can include synthetic rubber (including foam rubber) containing, for example, at least one type of nitrile rubber, styrene-butadiene rubber, fluorine rubber, acrylic rubber, and silicon rubber. In the case where the surfaces of the metal substrate are coated with the elastic body, it is preferable that a base treatment layer (not shown) be formed for good adhesive properties of the elastic body.

The gasket 4 is formed in a shape conforming to the upper end surfaces 211 and 311 of the side peripheral walls 21 and 31 of the case 2 and the cover 3 to surround the entire upstream chamber 23 and the entire downstream chamber 24 of the case 2, and has a circular bead portion 41 on the entire peripheries of the upper end surfaces 211 and 311, which serve as the butting surface. The circular bead portion 41 forms a sealing line that seals a space between the case 2 and the cover 3.

The gasket 4 has a supporting end 43 along the upper end surface 251 of the partition wall 25 of the case 2. The supporting end 43 has a bead portion 42 bridging between a part and another part on the circular bead portion 41 to seal the upper end surface 251 of the partition wall 25. The bead portions 41 and 42 are each a full bead that has a convex shape toward the case 2, but may be other bead shapes, such as a half bead.

Moreover, the gasket 4 has bolt holes 44 on its outer circumference. The positions of the bolt holes 44 and their number correspond to those of the bolt holes 22 and 32 of the case 2 and the cover 3.

The center plate 5 is formed of a thin metal substrate made of, for example, metal similar to the material of the gasket 4 and is disposed on the side of the gasket 4 facing the cover 3.

The center plate 5 is formed so as to have a shape that substantially blocks the top of the upstream chamber 23 of the case 2, more specifically, blocks the top of the upstream chamber 23 of the case 2 except having a flow path hole 51. The flow path hole 51 has a small-hole shape and serves as a flow path for a coolant that travels from the inside of the upstream chamber 23 toward the cover 3. As a result, the inner space of the case 2 and the cover 3 is partitioned into the side of the case 2 and the side of the cover 3. The flow path hole 51 of the center plate 5 is provided on the position corresponding to the impeller 100 (see FIG. 5), which is disposed on the side of the cover 3.

The center plate 5 is formed in a size enough to be within the inner peripheral side relative to the circular bead portion 41, which is the sealing line of the gasket 4. Specifically, the outer circumference of the center plate 5 is formed so as to have a size that does not reach the circular bead portion 41 of the gasket 4, and the end 52 of the center plate 5 does not reach the downstream chamber 24 of the case 2 and does not block the upper opening of the downstream chamber 24. The end 52 is disposed so as to be stacked on the bead portion 42 of the gasket 4.

The center plate 5 shown in the present embodiment is formed so as not to reach the upper end surface 311 of the side peripheral wall 31 of the cover 3, which serves as a butting surface against the case 2. That is, the center plate 5 is formed in such a manner that its outer circumference is shaped to conform to the inner surface of the side peripheral wall 31 of the cover 3, and thus does not reach the mutual butting surfaces (the upper end surfaces 211 and 311) between the case 2 and the cover 3 when sandwiched between the case 2 and the cover 3 in conjunction with the gasket 4.

The inner surface of the side peripheral wall 31 of the cover 3 has an engaging portion 36 (see FIGS. 4 and 6). The engaging portion 36 fits and engages the center plate 5 to receive it when the gasket 4 and the center plate 5 are sandwiched between the case 2 and the cover 3. The engaging portion 36 includes a strip portion 361 on the inner surface of the side peripheral wall 31 of the cover 3. As shown in FIG. 6, the strip portion 311 conforms to the inner surface and forms a step that steps down toward the bottom wall 33 of the cover 3 by the thickness of the center plate 5 from the upper end surface 311 of the side peripheral wall 31.

The engaging portion 36 functions to prevent the center plate 5 from floating up toward the cover 3 under the pressure of a fluid that flows from the upstream chamber 23 of the case 2 through the flow path hole 51 into the cover 3, maintains the fluid-path partitioning function of the center plate 5, and enables the fluid to pass smoothly. By engaging the center plate 5 with the engaging portion 36 so as to be received on the engaging portion 36, the center plate 5 is positioned to the appropriate position at the same time.

Figure 7:
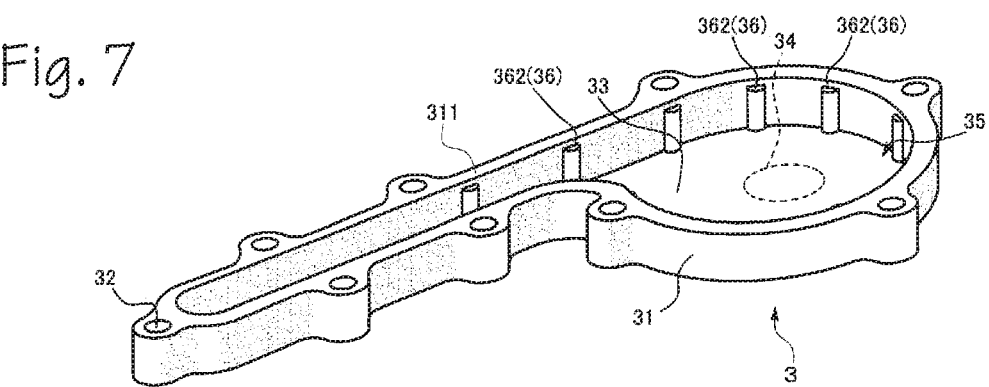
FIG. 7 is a perspective view of another embodiment of the cover of the casing in the vertically inverted state.

The engaging portion 36 is not limited to the strip portion 361 and can be formed with a plurality of protruding portions 362, which partially project from the inner surface of the side peripheral wall 31 of the cover 3, as shown in FIG. 7. This configuration can reduce materials for the engaging portion 36 in comparison with the strip portion 361 and can achieve weight reduction in the cover 3 accordingly.

Although not shown, the engaging portion 36 may be formed in a step by being recessed from the upper end surface 311 of the side peripheral wall 31 of the cover 3 by the thickness of the center plate 5.

The casing 1 is formed by stacking the gasket 4 and the center plate 5 on top of one another in such a manner that the center plate 5 is disposed on one side of the gasket 4 (in the present embodiment, the side of the cover 3) to be sandwiched between the case 2 and the cover 3, and fastening them together with fasteners (not shown), such as bolts, using the bolt holes 22, 32, and 44 of the case 2, the cover 3, and the gasket 4.

At this time, the center plate 5 fits in the inner peripheral side relative to the circular bead portion 41 of the gasket 4, and thus the circular bead portion 41 of the gasket 4 is directly pressed by the mutual butting surfaces (the upper end surfaces 211 and 311) between the case 2 and the cover 3. As a result, the circular bead portion 41 of the gasket 4 is compressed throughout its periphery, the space between the case 2 and the cover 3 is sealed water-tightly by the reaction force by the compression, whereby the sealing function is secured. Thus, the space between the case 2 and the cover 3 can be sealed with only one gasket 4, and therefore, unlike a conventional sealing structure, there is no need to dispose two gaskets in total on both sides of the center plate to sandwich the center plate therebetween. This can reduce the number of used gaskets and achieve weight reduction accordingly.

As represented in the present embodiment, the engaging portion 36 is formed in the cover 3, so that this engaging portion 36 receives and engages the center plate 5. This can reduce an influence of the center plate 5 on the compression of the circular bead portion 41 of the gasket 4, provide more improved sealing properties, and prevent the center plate 5 from floating up under fluid pressure.

It is preferable that the center plate 5 be fixed to the gasket 4 by fixing means at a part that deviates from the sealing line of the circular bead portion 41. As a result, the gasket 4 and the center plate 5 can be handled as one body, and the improved handling properties can provide good working properties of mounting the gasket 4 and the center plate 5.

In the present embodiment, as shown in FIG. 2, the fixing means are claw portions 45 provided to the supporting end 43 of the gasket 4, the supporting end 43 conforming to the upper end surface 251 of the partition wall 25. This configuration can fix the center plate 5 to the gasket 4 without affecting on the sealing function of the circular bead portion 41.

The claw portions 45 are bendable and formed so as to project from the supporting end 43 of the gasket 4 in appropriate number. After the center plate 5 is stacked on the gasket 4, the claw portions 45 are bent so as to hold the center plate 5. The bending of the claw portions 45 can fix the center plate 5 to the gasket 4. The center plate 5 can be fixed to the gasket 4 by only the bending work of the claw portions 45, and thus the fixation work is fairly easy.

The claw portions 45 may be provided on the center plate 5 instead of the gasket 4, or may be provided on both the gasket 4 and the center plate 5. The positions of the claw portions 45 and their number may be positions and a number that does not affect the sealing function of the circular bead portion 41, and is not limited to the shown positions and number.

Figure 8:
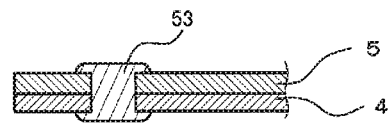
FIG. 8 is partial sectional view of the gasket and the center plate in their riveted state.

Alternately, for example, as shown in FIG. 8, the gasket 4 and the center plate 5 may be riveted together with a rivet 53 at a position that does not affect the sealing function of the circular bead portion 41.

In view of further improving the handling properties when the center plate 5 is stacked on the gasket 4, as represented in the present embodiment, it is preferable that the gasket 4 have a supporter 46 on the inner peripheral side of the circular bead portion 41, which is the sealing line. The supporter supports the stacked center plate 5.

The supporter 46 of the gasket 4 shown in FIG. 1 includes a plane portion 461 for supporting the periphery of the flow path hole 51 of the center plate 5 with a surface. The plane portion 461 is provided on the inner side of the circular bead portion 41 on the side of the upstream chamber 23 relative to the bead portion 42 on the supporting end 43 of the gasket 4 so as to substantially block the upper opening of the upstream chamber 23 of the case 2.

The gasket 4 has an opening 48 without blocking the upper opening of the downstream chamber 24 of the gasket 4. The opening 48 forms a fluid flow path that communicates the upstream chamber 23 of the case 2, the flow path 35 of the cover 3, and the downstream chamber 24 of the case 2 with each other.

The plane portion 461 has a flow path hole 47 in its central part. The flow path hole has a small-hole shape and serves as a flow path for a coolant that travels from the inside of the upstream chamber 23 of the case 2 toward the cover 3. The flow path hole 47 is disposed so as to communicate with the flow path hole 51 of the center plate 5.

Forming the plane portion 461 as the supporter 46 in the gasket 4 can stabilize the stacked state of the gasket 4 and the center plate 5 and improve the handling properties in their stacked state. The plane portion 461 can support the center plate 5 with a surface and thus the center plate 5 can be supported stably.

In the case where the fixing means including the claw portions 45 are provided, there is a concern in that the gasket 4 or the center plate 5 is deformed by the self-weight of the center plate 5 at the fixed part and the center plate 5 drops from the gasket 4, but the supporter 46 can avoid such problems.

Figure 9:
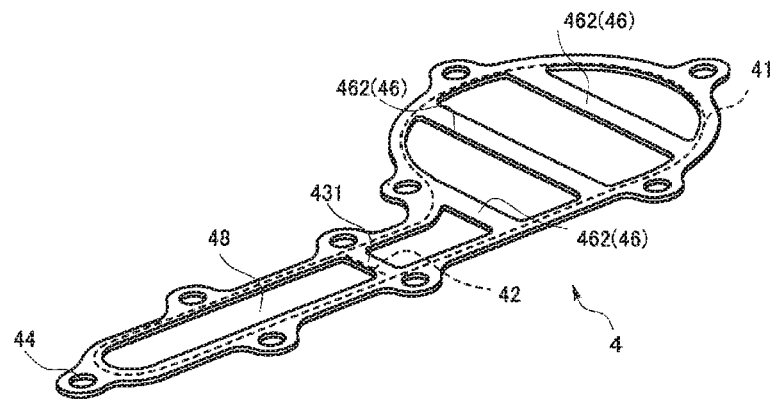
FIG. 9 is a perspective view of another embodiment of a supporter on the gasket.

As shown in FIG. 9, the supporter 46 may include an appropriate number of beam portions 462 instead of the plane portion 461. The beam portions 462 are formed inside the circular bead portion 41 of the gasket 4. The beam portions 462 each having a small width are formed so as to bridge the circular bead portion 41, and support the center plate 5 on a beam structure. The supporting end 43 of the supporter 46 of the gasket 4, which is located at the upper end surface 251 of the partition wall 25, serves as a bridging portion 431. The bridging portion has a bead portion 42 in its backside and seals the upper end surface 251 of the partition wall 25. This configuration reduces materials for the gasket 4 in comparison with the plane portion 461 and thus can achieve further weight reduction and material cost reduction.

In the above embodiment, the center plate 5 is disposed on the cover 3 of the gasket 4, but may be disposed on the case 2 of the gasket 4. In this case, the engaging portion 36 described above may be provided on the case 2.

Although the embodiment disclosed above has described the sealing structure for the casing for a water pump, the sealing structure for the casing according to the present invention is not limited to use in a water pump.

Second Invention

It is an object of the second invention to provide a sealing structure for a casing that can achieve further weight reduction with the sealing function of gaskets secured, and other objects will be apparent from the following description. The objects are solved by the following means.

A sealing structure for a casing includes:
a case, an interior of which is partitioned by a partition wall into an upstream chamber and a downstream chamber, a top of the upstream chamber and a top of the downstream chamber being each opened;
a cover that is attached to a top of the case to form therein a flow path for a fluid that communicates the upstream chamber and the downstream chamber with each other; and
a laminated gasket that is provided between the case and the cover and in which a first gasket on a side facing the case, a second gasket on another side facing the cover, and a center plate interposed between the first gasket and the second gasket are laminated, wherein;
the top of the downstream chamber of the case is not entirely blocked with the cover, but blocked with the center plate of the laminated gasket except having the flow path hole provided on a position proximity to the partition wall, through which a fluid passes.
Preferably, the first gasket is formed so as to surround the entire upstream chamber and the entire downstream chamber of the case, and
the second gasket is formed so as to surround the range from the upstream chamber of the case to the flow path hole of the center plate, so as to be smaller than the first gasket.
Preferably, in the sealing structure for the casing, the flow path of the cover is formed over the range from the upstream chamber of the case to the flow path hole of the center plate, and the bottom wall of the cover corresponding to a part of the center plate that blocks the downstream chamber of the case is opened.
Preferably, in the sealing structure for the casing, the cover is formed so as to be smaller than the case to cover the range from the upstream chamber of the case to the flow path hole of the center plate along the outline shape of the second gasket.

According to the second invention, the sealing structure for the casing that can achieve further weight reduction with the sealing function of gaskets secured can be provided.

Embodiments of the second invention will be described below with reference to the drawings.

The embodiments described below illustrate the sealing structure for the casing for a water pump. The configuration of such a water pump is publicly known. Thus, in the drawings, only parts related to the sealing structure for the casing are shown and components of the water pump are not shown except a part, in order to clarify the present invention.

Embodiments of the Second Invention

Figure 10:
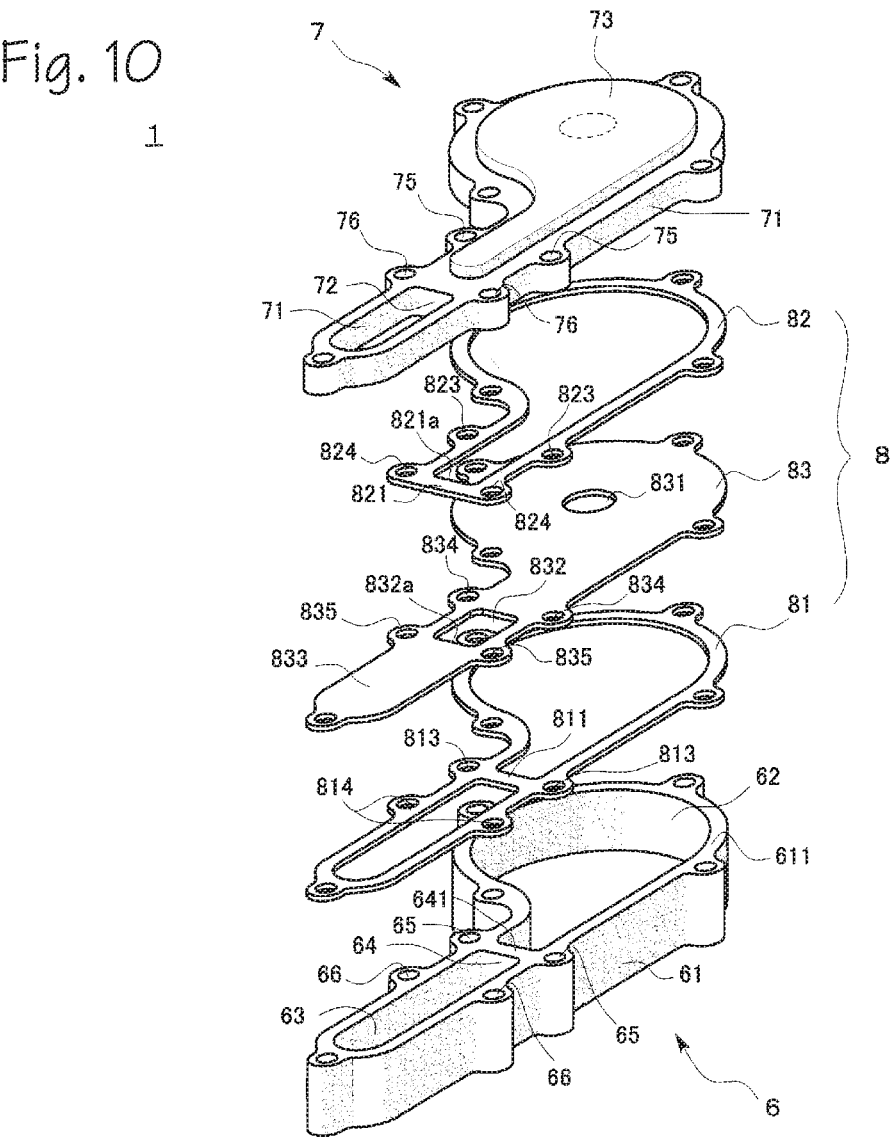
FIG. 10 is an exploded perspective view of an embodiment of the second invention of a sealing structure for a casing.
Figure 11:
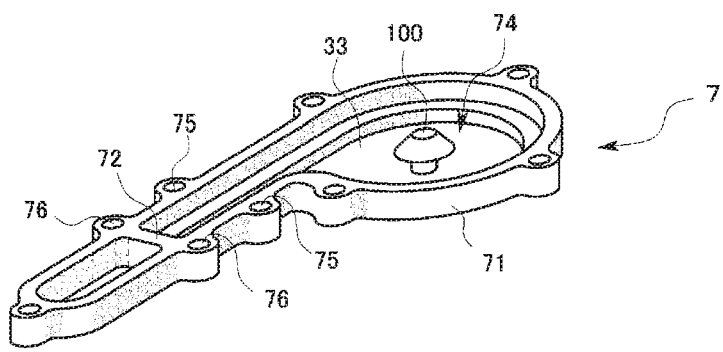
FIG. 11 is a perspective view of a cover of the casing shown in FIG. 10 in the vertically inverted state.
Figure 12:
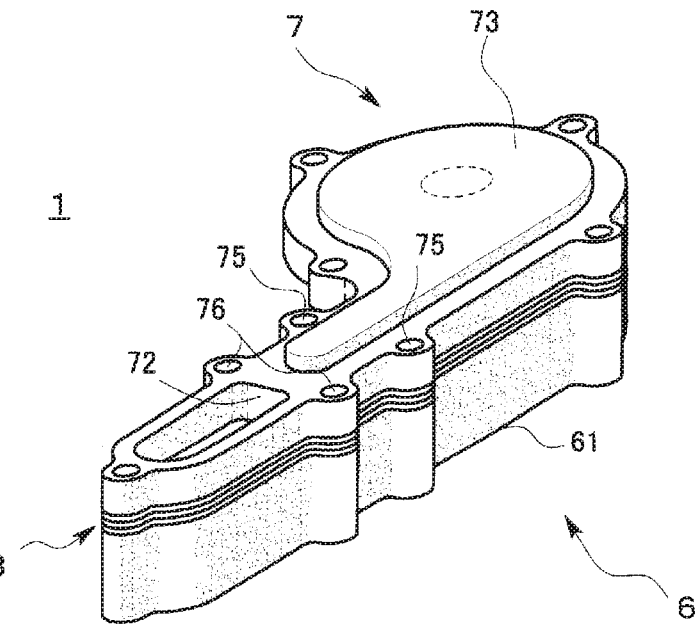
FIG. 12 is a perspective view of the entire structure of the casing shown in FIG. 10.
Figure 13:
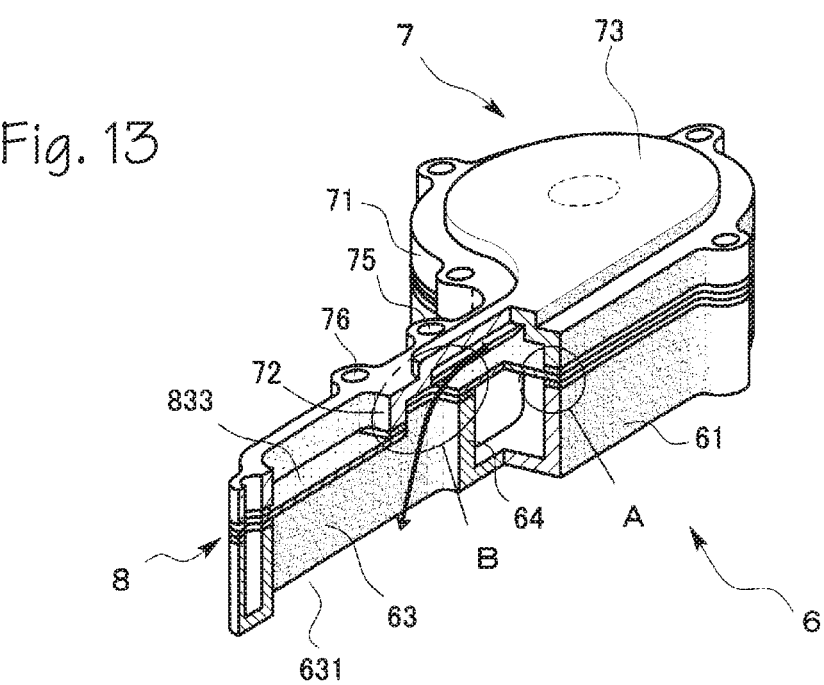
FIG. 13 is a cutaway perspective view of a part of the casing shown in FIG. 12.
Figure 14:
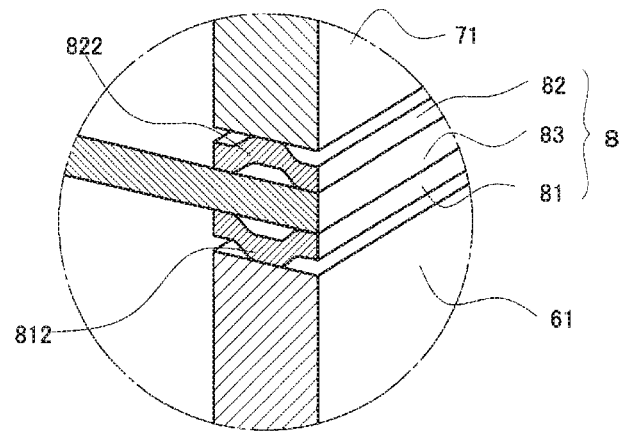
FIG. 14 is a magnified view of the part A in FIG. 13.
Figure 15:
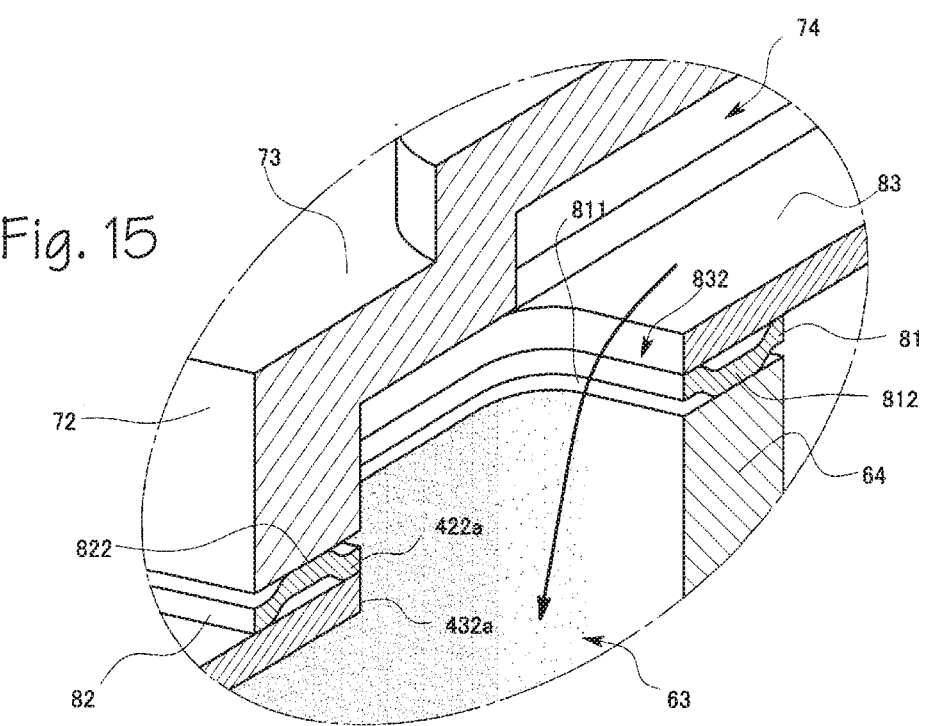
FIG. 15 is a magnified view of the part B in FIG. 13.

FIG. 10 is an exploded perspective view of an embodiment of a sealing structure for a casing according to the second invention. FIG. 11 is a perspective view of a cover of the casing shown in FIG. 10 in the vertically inverted state. FIG. 12 is a perspective view of the entire structure of the casing shown in FIG. 10. FIG. 13 is a cutaway perspective view of a part of the casing shown in FIG. 12. FIG. 14 is a magnified view of the part A in FIG. 13. FIG. 15 is a magnified view of the part B in FIG. 13.

The casing 1 includes a case 6 and a cover 7. The cover 7 is attached to the case 6 from the top side in the drawings, to form therein a flow path for a coolant. Each of the case 6 and the cover 7 is shown as a separate component, but may be a part of an engine or an engine-related component, for example.

The case 6 includes an upstream chamber 62 and a downstream chamber 63 therein, the upstream chamber 62 communicating with a radiator, the downstream chamber 63 communicating with an engine inside a side peripheral wall

61. The upstream chamber 62 includes an inlet (not shown). The inlet causes a coolant to flow in from the radiator. The downstream chamber 63 includes an outlet 631 (see FIG. 13). The outlet causes the coolant to flow out to the engine by the rotation of the impeller 100 (see FIG. 11), which is disposed on the side of the cover 7.

The interior of the case 6 is partitioned into two areas by a partition wall 64, which extends across the opposing sides on the side peripheral wall 61, to form the upstream chamber 62 and the downstream chamber 63. The upper end surface 641 of the partition wall 64 is formed so as to have the same height as the upper end surface 611 of the side peripheral wall 61. The upstream chamber 62 and the downstream chamber 63 are opened toward the top of case 6 on which the cover 7 is provided.

A laminated gasket 8 is disposed between the case 6 and the cover 7. The laminated gasket 8 includes a first gasket 81, a second gasket 82, and a center plate 83. The first gasket is disposed on a side facing the case 6, the second gasket is disposed on another side facing the cover 7, and the center plate is interposed between the first gasket 81 and the second gasket 82.

The first gasket 81 and the second gasket 82 are formed of a thin metal substrate, such as a stainless steel sheet, a cold-rolling steel sheet, a galvanized steel sheet, and an aluminum composite sheet, the surfaces of which are coated with an elastic body. Such an elastic body can include synthetic rubber (including foam rubber) containing, for example, at least one type of nitrile rubber, styrene-butadiene rubber, fluorine rubber, acrylic rubber, and silicon rubber.

The center plate 83 is formed of a sheet of metal similar to the material of the above metal substrate.

The first gasket 81 is formed in a shape that conforms to the upper end surface 611 of the partition wall 61 so as to surround the entirety of the upstream chamber 62 and the downstream chamber 63 of the case 6, and in the part of the gasket corresponding to the partition wall 64, a bridging portion 811 is formed so as to conform to the upper end surface 641 of the partition wall 64. As shown in FIGS. 14 and 15, a bead 812 is formed on the surface of the first gasket 81 throughout its entire periphery (including the bridging portion 811).

The center plate 83 is formed in such a manner as that its outline shape is the same shape as the outline shape of the first gasket 81. To vertically partition a space formed between the case 6 and the cover 7 (a flow path for a cooling water), the center plate 83 is formed so as to block the top of the upper chamber 62 of the case 6 except having the first flow path hole 831, for the region corresponding to the upstream chamber 62 of the case 6. The first flow path hole 831 has a small-hole shape and serves as a flow path for a coolant that travels from the inside of the upstream chamber 62 toward the cover 7. The first flow path hole 831 corresponds to the position of the impeller 100, which is disposed on the side of the cover 7, and is disposed around the center of the upstream chamber 62 of the case 6. This hole has a circular shape, but may be any shape.

For the region corresponding to the downstream chamber 63 of the case 6, the center plate 83 is formed so as to block the upper opening of the downstream chamber 63 of the case 6 except having the second flow path hole 832. The second flow path hole 832 has a small-hole shape and serves as a flow path for a coolant that travels from the side of cover 7 to the inside of the downstream chamber 63 of the case 6. The second flow path hole 832 is provided on a position proximity to the partition wall 64 of the case 6, preferably a position proximity to the partition wall 64 as shown in FIG. 15. This hole has a quadrangle shape, but may be any shape.

In contrast, the second gasket 82 is formed so as to have a size that surrounds the range from the upstream chamber 62 of the case 6 to the second flow path hole 832 of the center plate 83. Specifically, for the part corresponding to the upstream chamber 62 of the case 6, the second gasket 82 is formed so as to have a shape that surrounds the upstream chamber 62 in the same manner as the first gasket 81, and for the part corresponding to the downstream chamber 63 of the case 6, the second gasket 82 is formed to have a size allowing the second flow path hole 832 to be located therein, the second flow path hole 832 being provided to a position proximity to the partition wall 64, and does not surround the entirety of the downstream chamber 63. More specifically, as shown in FIG. 15, the second gasket 82 is formed in such a manner as that its inside edge 821*a* at the end 821 on the side of the downstream chamber 63 corresponds to the position of the inside edge 832*a* of the second flow path hole 832 farthest from the partition wall 64. Thus, the second gasket 82 is formed so as to be smaller than the first gasket 81. As shown in FIGS. 14 and 15, the bead 822 is also formed on the surface of the second gasket 82 throughout its entire periphery.

The cover 7 has a side peripheral wall 71, which has the same shape as the side peripheral wall 61 of the case 6, and a sealing wall 72 is formed across the opposing sides on the side peripheral wall 71 so as to conform to the end 821 of the second gasket 82 on the side of the downstream chamber 63.

The bottom wall 73 of the cover 7 is not formed on the entire side peripheral wall 71. Specifically, the bottom wall 73 covers the upper part of the entire upstream chamber 62 of the case 6 while not covering the upper part of the entire downstream chamber 63, and is only formed over the range from the upstream chamber 62 to the sealing wall 72. The inside of the cover 7 that is covered with the bottom wall 73 of the cover 7 serves as a flow path 74. The flow path communicates the upstream chamber 62 and the downstream chamber 63 of the case 6 with each other. That is, the flow path 74 of the cover 7 is formed over the range from the upstream chamber 62 of the case 6 to the second flow path hole 832 of the center plate 83.

Beyond the sealing wall 72 of the cover 7, only the side peripheral wall 71 is provided and the bottom wall corresponding to the part 833 of the center plate 83 is opened. This part blocks the upper opening of the downstream chamber 63 of the case 6. This achieves weight reduction in the cover 7 by the opened bottom wall.

In this casing 1, the case 6 is butted against the cover 7 with the laminated gasket 8 sandwiched therebetween, and they are then fastened with bolts (not shown) using the bolt holes formed on the case 6, the cover 7, and the laminated gasket 8. This causes the beads 812 and 822 of the first gasket 81 and the second gasket 82 to be compressed, seals the space between the case 2 and the cover 3 water-tightly by the reaction forces of the beads 812 and 822 by the compression, whereby the sealing function is secured.

This forms the upstream chamber 62, the downstream chamber 63, and the flow path 74 in the casing 1. The flow path communicates these two chambers with each other. The rotation of the impeller 100, which is disposed on the cover 7, causes a coolant to travel from the upstream chamber 62 through the first flow path hole 831 into the flow path 74, and then, as indicated by the arrows in FIGS. 13 and 15, causes the coolant to travel from the flow path 74 beyond the partition wall 64 into the second flow path hole 832 and flow through the second flow path hole 832 into the downstream chamber 63.

The bolt holes will be described. As shown, the bolt holes are disposed on the entire peripheries of the side peripheral walls 61 and 71 of the case 6 and the cover 7. In particular, the fastening with bolts using the bolt holes 65 and 65, which are disposed so as to sandwich the partition wall 64 of the case 6, and the bolt holes disposed correspondingly, i.e., the bolt holes 75, 75, 813, 813, 823, 823, 834, and 834 of the cover 7 and the laminated gasket 8 can achieve good compression of the bead 812 on the bridging portion 811 of the first gasket 81 and achieve good sealing properties of the upper end surface 641 of the partition wall 64.

Similarly, the fastening with bolts using the bolt holes 66 and 66, which are disposed so as to sandwich the sealing wall 72 of the cover 7, and the bolt holes disposed correspondingly, i.e., the bolt holes 76, 76, 814, 814, 824, 824, 835, and 835 of the case 6 and the laminated gasket 8 can achieve good compression of the bead 822 on the end 821 of the second gasket 82 and achieve good sealing properties in the sealing wall 72.

In the casing 1, which is thus formed, the center plate 83 blocks the upper opening of the downstream chamber 63 of the case 6, and the cover 7 only blocks the range from the upstream chamber 62 to the second flow path hole 832. This reduces a region sealed with the cover 7 and enables weight reduction and material cost reduction in the cover 7 accordingly. In the present embodiment, the bottom wall of the cover 7 corresponding to the part 833 of the center plate 83 is opened. This part blocks the downstream chamber 63. The cover 7 is formed of thick metal relative to the thin center plate 83. Thus, although the area of the center plate 83 increases, the area of the bottom wall of the cover 7 corresponding to this decreases. This leads to further weight reduction in view of the entirety of the casing 1.

In the present embodiment, the second gasket 82 is also downsized relative to the first gasket 81, and weight reduction and material cost reduction can be achieved accordingly. This is advantageous in the present invention.

The downsized second gasket 82 can produce the gap corresponding to the thickness of the second gasket 82 between the cover 7 and the part 833 of the center plate 83. In this case, it is preferable that the step (not shown) corresponding to the gap be formed on the end surface of the side peripheral wall 71 of the cover 7.

Another Embodiment of the Second Invention

Figure 16:
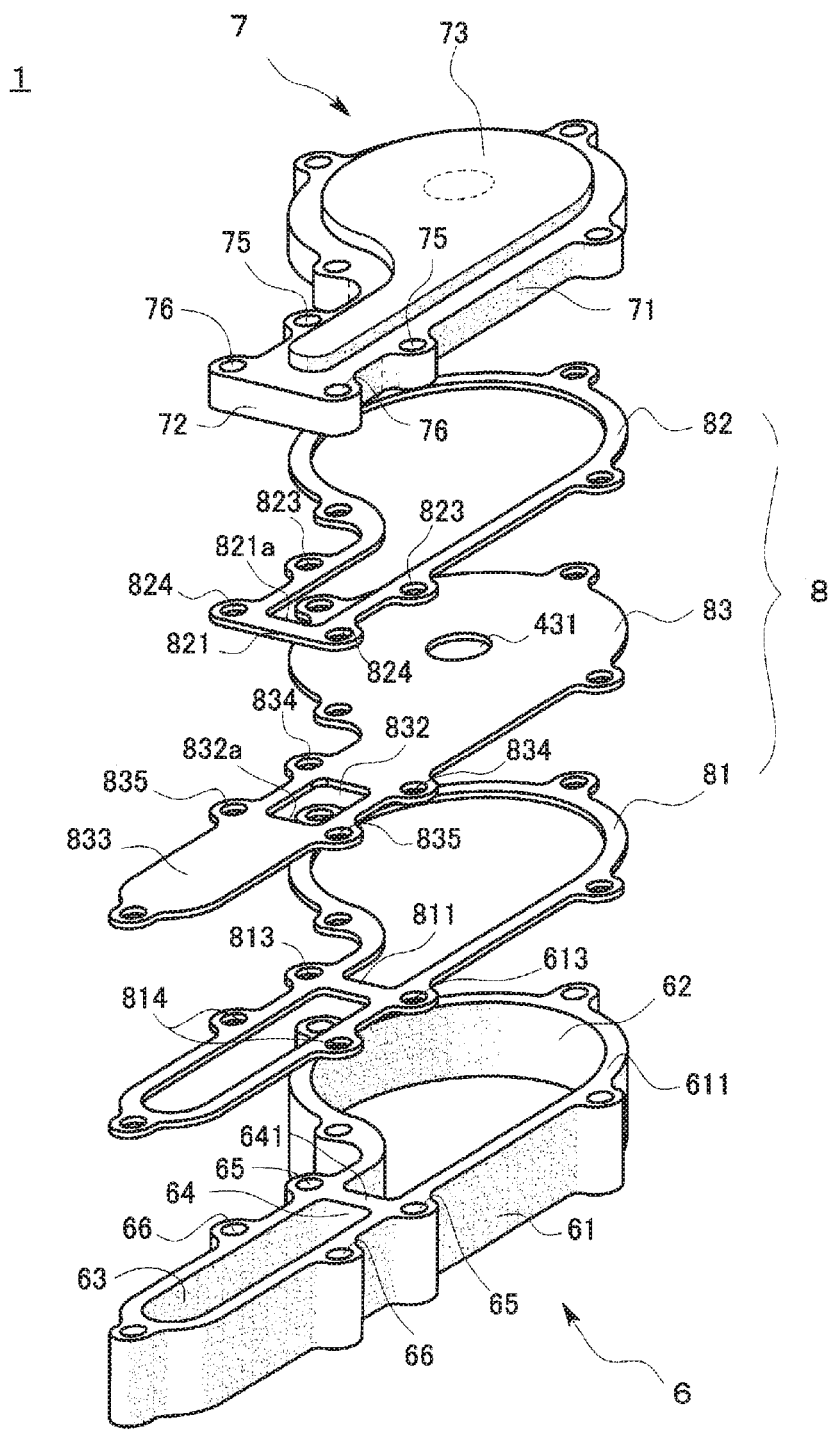
FIG. 16 is an exploded perspective view of another embodiment of the sealing structure for the casing according to the second invention.
Figure 17:
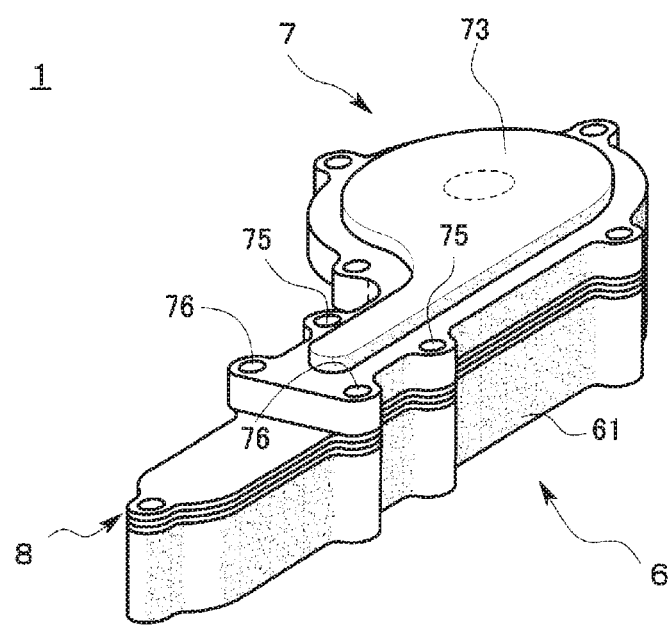
FIG. 17 is a perspective view of the entire structure of the casing shown in FIG. 16.

Next, FIG. 16 is an exploded perspective view of another embodiment of the sealing structure for the casing according to the second invention. FIG. 17 is a perspective view of the entire structure of the casing shown in FIG. 16. Since parts having the same characters as those in FIGS. 10 and 12 indicate parts having the same configurations, the description of FIGS. 10 and 12 is cited for the description thereof and such description is omitted here.

In the casing 1, the cover 7 is formed so as to be smaller than the case 6 to cover the range from the upstream chamber 62 of the case 6 to the second flow path hole 832 of the center plate 83 along the outline shape of the second gasket 82.

That is, the cover 7 differs from the cover 7 shown in one embodiment of the second invention only in that it does not have a side peripheral wall beyond the sealing wall 72 and includes the sealing wall 72 as a part of the side peripheral wall 71.

This configuration can further downsize the cover 7 in addition to the effects of one embodiment of the second invention aforementioned and thus can achieve further weight reduction and material cost reduction. Furthermore, the downsizing of the cover 7 can downsize the casing 1.

Although the above embodiments have described the sealing structure for the casing for a water pump, the sealing structure for the casing according to the second invention is not limited to use in a water pump.

EXPLANATIONS OF LETTERS OR NUMERALS

1 casing
2 case
21 side peripheral wall
211 upper end surface
22 bolt hole
23 upstream chamber
24 downstream chamber
25 partition wall
251 upper end surface
3 cover
31 side peripheral wall
311 upper end surface
32 bolt hole
33 bottom wall
34 penetrating portion
35 flow path
36 engaging portion
361 strip portion
362 projecting portion
4 gasket
41 circular bead portion (sealing line)
42 bead portion
43 supporting end
431 bridging portion
44 bolt hole
45 claw portion
46 supporter
461 plane portion
462 beam portion
47 flow path hole
5 center plate
51 flow path hole
52 end
53 rivet
100 impeller
101 shaft portion
6 case
61 side peripheral wall
611 upper end surface
62 upstream chamber
63 downstream chamber
631 outlet
64 partition wall
641 upper end surface
65, 66 bolt holes
7 cover
71 side peripheral wall
72 sealing wall
73 bottom wall
74 flow path
75, 76 bolt holes
8 laminated gasket
81 first gasket
811 bridging portion
812 bead 813, 814 bolt holes
82 second gasket
821 end
821a inside edge
822 bead
823, 824 bolt holes
83 center plate
831 first flow path hole
832 second flow path hole (flow path hole)
832a inside edge
833 part
834, 835 bolt holes While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A sealing structure for a casing, comprising:
    a case having an interior which is partitioned by a partition wall into an upstream chamber and a downstream chamber, the upstream chamber and the downstream chamber have adjacent openings;
    a cover adapted to seal the opening in the upstream chamber and at least a portion of the opening in the downstream chamber to form a flow path between the upstream chamber and the downstream chamber;
    a gasket between the case and the cover, the gasket configured to seal an unsealed portion of the opening in the downstream chamber, the gasket having a flow path hole therethrough proximate the partition wall,
    a center plate configured to seal the unsealed portion of the opening in the downstream chamber, the center plate having a flow path hole therethrough proximate the partition wall; and
    the center plate vertically partitions a space between a butting surface on the case and a butting surface on the cover.

2. The sealing structure of claim 1, wherein the gasket comprises:
    a first gasket between the center plate and the case; and
    a second gasket between the center plate and the cover.

3. The sealing structure of claim 2, wherein the first gasket is sized to conform to the openings in both the upstream and the downstream chambers.

4. The sealing structure of claim 3, wherein the second gasket is smaller than the first gasket.

5. The sealing structure of claim 4, wherein the second gasket is sized to conform to the opening in the upstream chamber of the case and the portion of the downstream chamber sealed by the cover.

6. The sealing structure of claim 1, wherein the cover is smaller than the openings in the upstream chamber and the downstream chamber.

7. The sealing structure of claim 1, wherein the cover is sized to seal both the opening in the upstream chamber and the flow path hole in the gasket proximate the partition wall.

8. The sealing structure of claim 1, wherein the gasket is sized to correspond to the size of the cover.

9. The sealing structure of claim 8, wherein the gasket has at least one flow path hole proximate the upstream opening in the case.

10. The sealing structure of claim 1, wherein the center plate is sized to correspond to the size of the cover.

11. The sealing structure of claim 10, wherein the center plate has at least one flow path hole proximate the upstream opening in the case.

12. The sealing structure of claim 1, wherein the gasket includes a first gasket between the center plate and the case and a second gasket between the center plate and the cover, and the first gasket, the center plate, and the second gasket have different shapes.

13. The sealing structure of claim 1, wherein the gasket comprises:
    the center plate between the case and the cover and one or more gaskets between the center plate and the case.

14. A sealing structure for a casing, comprising:
    a case having an interior that is partitioned by a partition wall into an upstream chamber and a downstream chamber, the upstream chamber and the downstream chamber having adjacent openings;
    a cover adapted to seal the opening in the upstream chamber and at least a portion of the opening in the downstream chamber, the cover defining a flow path between the upstream chamber and the downstream chamber; and
    a gasket between the case and the cover, the gasket configured to seal an unsealed portion of the opening in the downstream chamber, and the gasket having a flow path hole therethrough proximate the partition wall,
    wherein the gasket includes a center plate configured to seal the unsealed portion of the opening in the downstream chamber, the center plate having a flow path hole therethrough proximate the partition wall, a first gasket between the center plate and the case, and a second gasket between the center plate and the cover, wherein the first gasket is sized to conform to the openings in both the upstream and the downstream chambers, and wherein the second gasket is smaller than the first gasket.

* * * * *